2 Sheets—Sheet 1.
G. GURNEY.
Winding-on Mechanism for Spinning-Mules.
No. 204,214. Patented May 28, 1878.
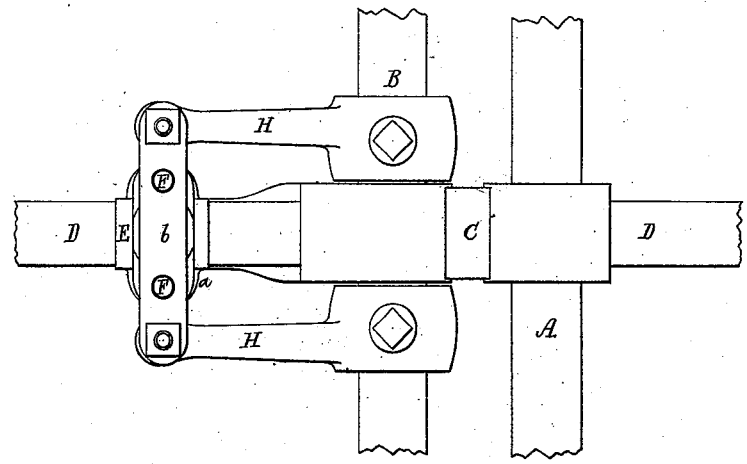
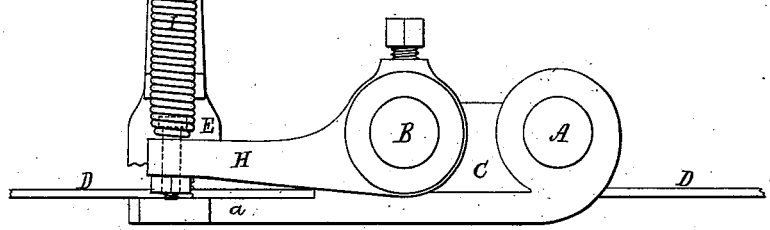
Fig. 3.
Fig. 2.
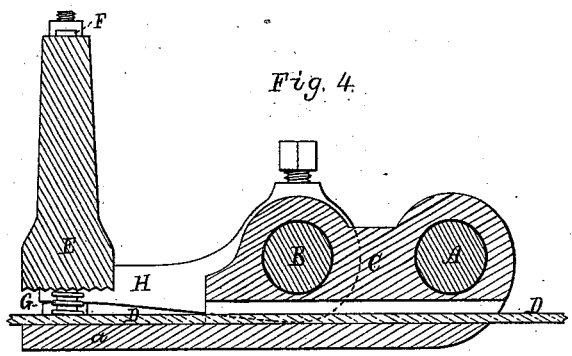
Fig. 4.
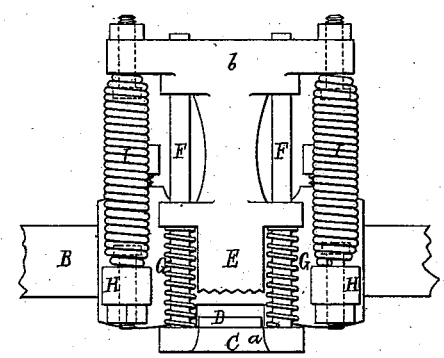
Witnesses.
S. N. Piper
L. W. Müller
Inventor
George Gurney.
by his attorney
R. H. Eddy 2 Sheets—Sheet 2.
G. GURNEY.
Winding-on Mechanism for Spinning-Mules.
No. 204,214. Patented May 28, 1878.
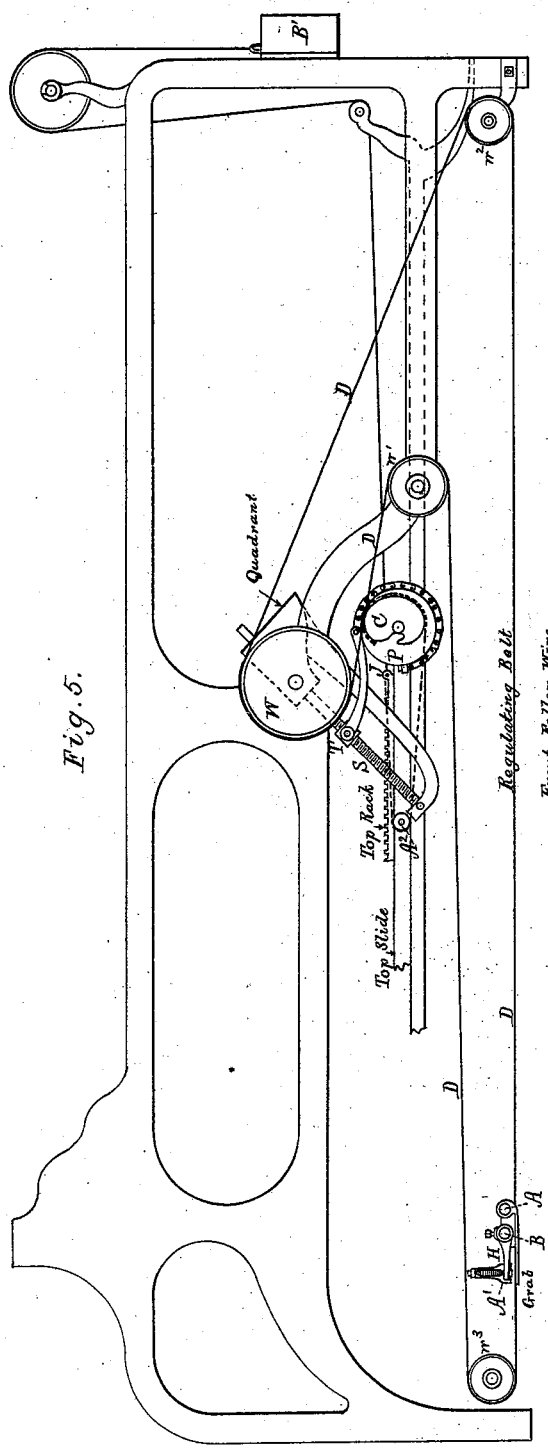
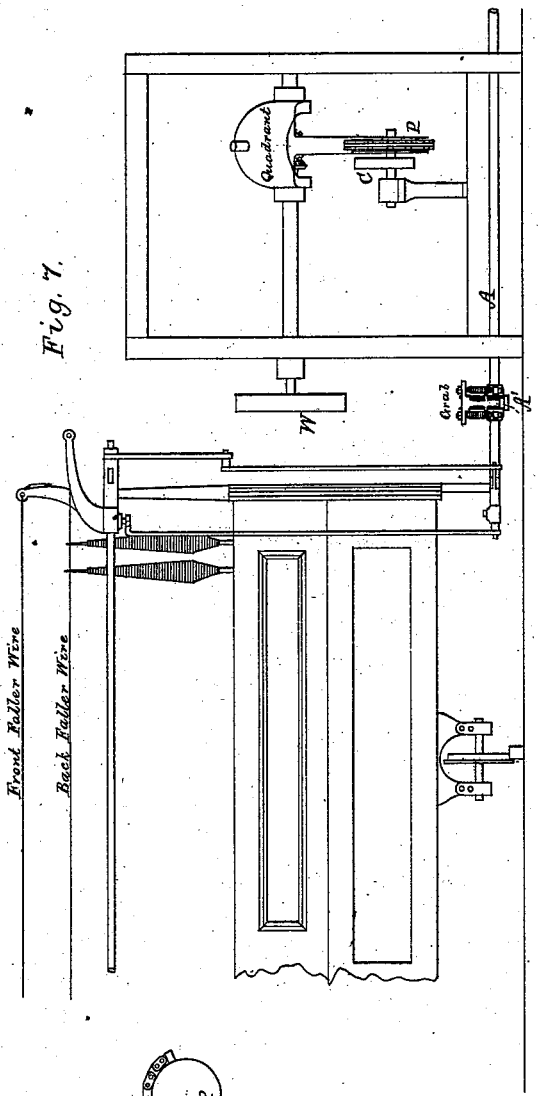
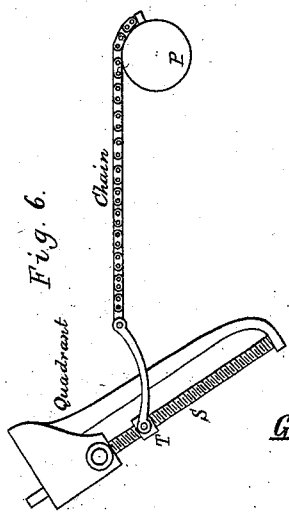
Witnesses
S. N. Piper
L. W. Möller
Inventor
George Gurney,
by his attorney
R. H. Eddy

UNITED STATES PATENT OFFICE.

GEORGE GURNEY, OF TAUNTON, MASSACHUSETTS.

IMPROVEMENT IN WINDING-ON MECHANISMS FOR SPINNING-MULES.

Specification forming part of Letters Patent No. 204,214, dated May 28, 1878; application filed March 14, 1878.

*To all whom it may concern:*

Be it known that I, GEORGE GURNEY, of Taunton, in the county of Bristol and State of Massachusetts, have invented an improved clamp for connecting the carriage of a mule for spinning with the endless belt for revolving the driving-pulley of the operative screw of the winding-regulating mechanism of such mule; and do hereby declare the same to be fully described in the following specification and represented in the accompanying drawings, of which—

Figure 1 is a top view, Fig. 2 a front elevation, Fig. 3 a side view, and Fig. 4 a longitudinal section, of the said clamp and portions of the said endless belt, and the usual carriage-connection shafts of a mule.

The said clamp consists of three arms and a movable jaw, arranged and combined with each other and with the two connecting-shafts of the mule carriage or carriages, and provided with joining and elevating springs, all being essentially as hereinafter set forth and as represented.

In the drawings, the two connection-shafts are shown at A B. With these shafts a horizontal arm, C, is arranged, and to them it is applied in manner as shown. Each shaft revolves independently of the arm, and both serve to sustain it in position.

The belt D extends under the shafts and through this arm, and rests on the front part *a* thereof, and has over it a movable jaw, E. The said jaw is adapted to slide vertically on two guide-rods, F F, extended up from the arm C, there being on each of such rods a helical spring, G, for forcing the jaw upward.

The upper cross-head *b* of the jaw is connected, by means of helical springs I I, arranged as represented, with the two arms H H, fixed to and extending from the shaft B, the arm C being directly between such arms H H.

By turning the shaft B the clamp-jaw E will be forced down upon the belt, and will clamp it to the arm C, and consequently so connect the belt with the carriage as to cause the former to move with and be moved by the latter, and thereby revolve the driving-wheel of the aforesaid operative screw, and consequently put in action the mechanism for regulating the winding of the yarns on the spindles or cops.

By the yarns pressing down on the back follower at the starting in of the mule-carriage, to enable them to be wound on the cops, the mechanism by which such follower is connected with the shaft B will be caused to revolve or turn such shaft sufficiently to effect the depression of the jaw upon the belt, as mentioned.

I use springs I I, rather than rods, for connecting the jaw cross-head with the arms H H, as such springs enable the jaw to be operated by a yielding pressure, and thereby to hold to the belt to better advantage than would result were rods substituted for such springs.

The helical springs G G are for forcing the jaw upward off the belt at the commencement of the starting out of the carriage.

The invention herein described is specially applicable to what is termed the well-known "Mason spinning-mule," parts of which are represented in the accompanying drawings, marked Figs. 5, 6, and 7.

The shafts A B are shown in Figs. 5 and 7 with the clamp applied to them and the regulating-belt D, which works around the pulleys $w^1$, $w^2$, and $w^3$, and the quadrant-pulley W. In these drawings, P denotes the wind-cam plate; C, the wind-cam; W, the quadrant-pulley; $A^1$, the clamp or "grab," as it is also termed; S, the quadrant-screw; T, the quadrant-nut; B′, the weight, tending to draw the top rack to the right.

$A^2$ is the small chain-pulley on the top slide. The chain from the cam C runs about the pulley $A^2$, and is fastened to a small pin, J, at the end of the top rack.

I claim—

The improved belt-clamp, substantially as described, consisting of the arms C H H and the jaw E, arranged and combined with each other and with the two mule-shafts A B, and provided with the joining and elevating springs I I G G, essentially as set forth.

GEORGE GURNEY.

Witnesses:
R. H. EDDY,
JOHN R. SNOW.